No. 764,253. PATENTED JULY 5, 1904.
A. PELOUX.
ELECTRIC METER.
APPLICATION FILED APR. 13, 1903.
NO MODEL. 2 SHEETS—SHEET 1.
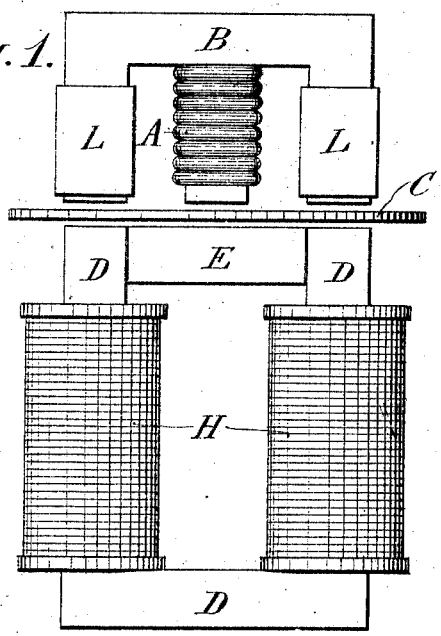
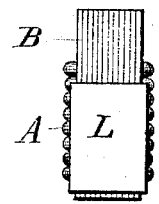
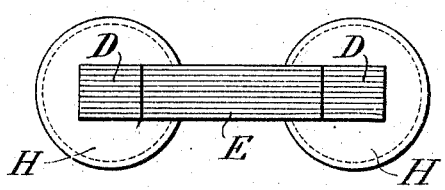
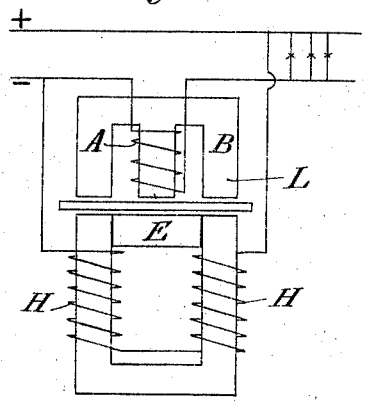
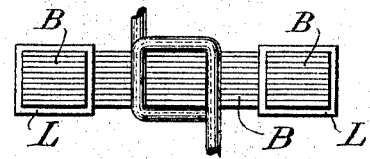
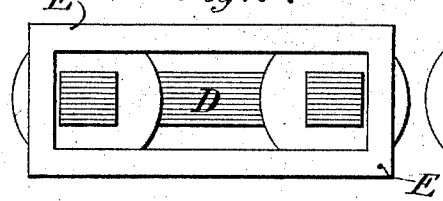
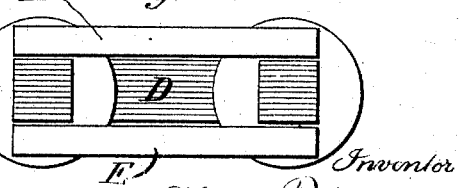
Witnesses
Chas H Smith
Bertha M Allen
Inventor
Albert Peloux
per Harold Serrell
atty No. 764,253. PATENTED JULY 5, 1904.
A. PELOUX.
ELECTRIC METER.
APPLICATION FILED APR. 13, 1903.
NO MODEL. 2 SHEETS—SHEET 2.
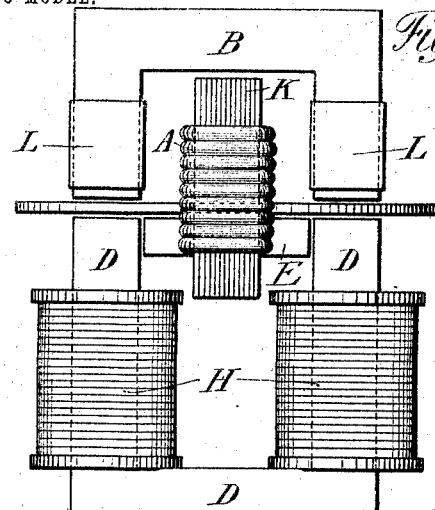
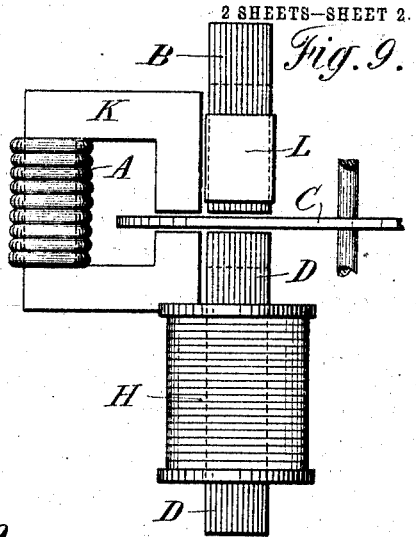
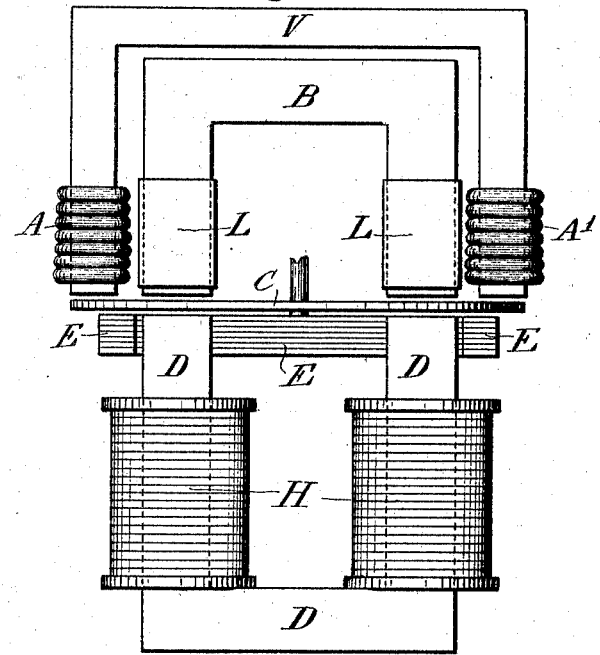
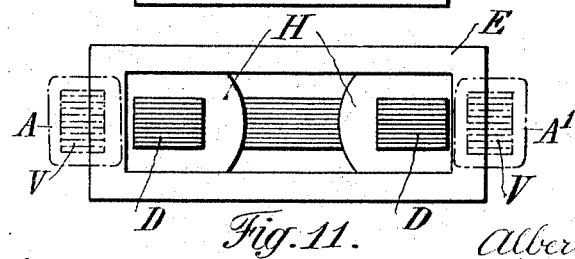
Witnesses
Chas H. Smith
Bertha M. Allen
Inventor
Albert Peloux
per Harold Surrell
Atty.

No. 764,253. Patented July 5, 1904.

UNITED STATES PATENT OFFICE.

ALBERT PELOUX, OF GENEVA, SWITZERLAND, ASSIGNOR TO SOCIÉTÉ ANONYME DES ATELIERS DE MECANIQUE DE PRECISION DE TERRITET, OF TERRITET, SWITZERLAND, A CORPORATION OF SWITZERLAND.

ELECTRIC METER.

SPECIFICATION forming part of Letters Patent No. 764,253, dated July 5, 1904.

Application filed April 13, 1903. Serial No. 152,341. (No model.)

*To all whom it may concern:*

Be it known that I, ALBERT PELOUX, a citizen of the Republic of Switzerland, residing at Geneva, Switzerland, have invented an Improvement in Electric Meters, of which the following is a specification.

My invention relates particularly to that class of electric meters known as "induction-motor" meters employed in measuring alternating electric currents.

In carrying out my invention I preferably employ an iron or steel core, upon the poles of which are wound, respectively, a series coil of the working circuit and closed coils of any suitable material, a second core upon the poles of which are wound coils shunted across the main circuit, and a core, also of iron or steel, placed between the poles of the shunt-coil core, causing a displacement of the flux in the two cores and that in the core of the shunt-coils to lag the full quadrature behind the impressed electromotive force in the series coils, which is the most efficient angle of lag under all conditions of load, whether inductive or non-inductive.

In the drawings, Figures 1 and 2 are respectively a front and a side elevation of an electric meter constructed according to the present invention. Fig. 3 is a plan of that portion of the device shown in Fig. 1 which is placed underneath the disk. Fig. 4 is an inverted plan of that portion of the device shown in Fig. 1 which is placed above the disk. Fig. 5 is a diagram of the electrical circuits of the meter. Figs. 6 and 7 show modifications of the arrangement of the core placed between the poles of the shunt-coil core. Figs. 8 and 9 are front and side elevations, respectively, of a modification of my invention. Fig. 10 is a front elevation of a further modification of my present invention, and Fig. 11 is a plan of that portion of the meter shown in Fig. 10 which is situated beneath the disk.

Referring to Figs. 1 and 2, I preferably employ a three-pole core B, of laminated iron or steel, and on the center pole of this core a coil A in series with the working circuit is wound, and on the outside poles of the core B, I employ closed coils L L, insulated from the poles of the core and made of any suitable material and in any desired shape, the function of which will be hereinafter described.

I also employ a U-shaped core D, whose poles are provided with shunt-coils H H, and the poles of the core D are preferably in line with the outside poles of the core B and have a separate core E extending between them. An armature or disk C is arranged to pass between the poles of the respective cores B and D.

As is well understood in the art, the self-inductance in the shunt-circuit causes the current therein to lag behind the impressed electromotive force, and the flux set up in the core of the shunt-coils is in phase with this current. By the employment of the separate core E, placed between the poles of the core D, the self-induction in the shunt-circuit is increased, necessarily increasing the lag of the current in the shunt-coils behind the impressed electromotive force. This angle of lag, however, will be somewhat less than ninety degrees, and in order to cause a resultant magnetic field-generating current in the armature which under all loads will exert a torque on the armature proportional to the power consumed in the working circuit it is necessary to cause a further displacement of the phase of the flux in the core D, so that it will lag the full quadrature behind the impressed electromotive force. This result is accomplished by the employment of the closed coils L, placed on the poles of the core B, which are in line with the poles of the core D, and by adjusting the location of the core E to such a position that the flux in the core D will lag the full quadrature behind the impressed electromotive force in order that the fluxes set up by the series coils and by the shunt and closed coils may produce the desired resultant magnetic field. Besides making a more compact apparatus I have found that by placing the closed coils on the opposite side of the armature from the shunt-coils I obtain more accurate results, and the effect of the core E may be varied either by increasing or diminishing the air-gaps between the ends thereof and the poles of the core D, thereby diminishing or increasing the self-inductance in the shunt-circuit, or preferably by moving the core E toward or away from the armature, and thereby increasing or diminishing the self-inductance in the shunt-circut. I have also found that the most efficient position of the core E is with its upper surface very slightly above the extremities of the poles of the core D.

Figs. 6 and 7 illustrate modifications of the core-piece E, the former showing the core as an inclosed rectangle inclosing the poles of the core D, and the latter as two-bar cores extending to the outside faces of the poles of the core D.

Figs. 8 and 9 show a modification of my invention wherein the center pole of the core B is dispensed with and the series coil A is wound on a separate core, so arranged that the armature C revolves between the poles thereof.

Figs. 10 and 11 show a still further modification of my invention, in which there are two series coils A A' wound on either end of a U-shaped core V, placed exteriorly of the core B, and in which instance the shape of the core E employed is preferably that shown in Fig. 6.

I claim as my invention—

1. In an electric induction-motor meter, the combination with a disk-armature, of a core, closed circuited windings on the said core, and a series coil all on one side of said disk-armature, and a core, shunt-coils on said core, and a separate core extending between the poles of the last aforesaid core on the other side of said disk-armature.

2. In an electric induction-motor meter, the combination with a disk-armature, of a three-pole core, a series coil on the center pole of said core, and closed circuited windings on the outside poles of said core, all on one side of said disk-armature, and a U-shaped core, shunt-coils on said U-shaped core, and a separate core extending between the poles of the said U-shaped core, the poles of the said U-shaped core being in line with the outside poles of the said three-pole core.

3. In an electric induction-motor meter, the combination with a disk-armature, of a core, closed circuits on said core and on one side of said disk, a core, shunt-coils on the same, and a core between the poles of said shunt-coil core on the opposite side of said disk, and a series coil placed symmetrically with regard to said shunt-coils, substantially as set forth.

In testimony that I claim the foregoing as my invention I have signed my name in presence of two subscribing witnesses.

ALBERT PELOUX.

Witnesses:
 Y. IMER,
 L. H. MUNIER.